US006340153B1

(12) United States Patent
Miesner (10) Patent No.: US 6,340,153 B1
(45) Date of Patent: Jan. 22, 2002

(54) SHOCK AND ACOUSTIC MOUNT

(75) Inventor: John E. Miesner, Fairfax, VA (US)

(73) Assignee: General Dynamics Advanced Technology Systems, Inc., Greensboro, NC (US)

( * ) Notice: Subject to any disclaimer, the term of this patent is extended or adjusted under 35 U.S.C. 154(b) by 0 days.

(21) Appl. No.: 09/704,928

(22) Filed: Nov. 2, 2000

(51) Int. Cl.$^7$ .................................................. F16F 5/00
(52) U.S. Cl. ............. 267/140.11; 188/378; 188/322.16; 188/316; 188/322.17; 267/136; 267/64.15; 267/64.11; 267/64.26; 267/129
(58) Field of Search ......................... 267/140.11, 64.11, 267/64.26, 64.15, 129, 136; 188/322.17, 269, 297, 317, 312, 313, 378–380, 322.16, 286, 287, 316, 322.18; 248/631, 562, 636, 638

(56) References Cited

U.S. PATENT DOCUMENTS

| 894,117 A | 7/1908 | Clark |
| 1,136,968 A | 4/1915 | McDade |
| 2,912,069 A | 11/1959 | Dillenburger ................. 188/88 |
| 3,807,678 A | 4/1974 | Karnopp et al. ......... 248/358 R |
| 3,888,436 A | * 6/1975 | Sealey |
| 3,963,227 A | 6/1976 | Mölders ...................... 267/120 |
| 3,993,294 A | 11/1976 | Wössner et al. ........... 267/64 R |
| 4,245,825 A | 1/1981 | Ohtomo et al. ............ 267/64 R |
| 4,405,119 A | 9/1983 | Masclet et al. ........... 267/64.22 |
| 4,445,672 A | 5/1984 | Turiot ...................... 267/64.16 |
| 4,647,026 A | 3/1987 | Siemann et al. .......... 267/64.15 |
| 4,653,618 A | 3/1987 | Churchill et al. ....... 188/322.17 |
| 4,720,085 A | 1/1988 | Shinbori et al. ......... 267/64.16 |
| 4,749,152 A | 6/1988 | Veaux et al. ............ 244/104 EP |
| 4,795,009 A | 1/1989 | Tanahashi et al. ........... 188/315 |
| 4,815,716 A | 3/1989 | Scotto ...................... 267/64.16 |
| 4,838,393 A | 6/1989 | Mourray et al. ............. 188/284 |
| 4,865,170 A | 9/1989 | Ciepichal ............... 188/322.17 |
| 4,896,866 A | 1/1990 | Legrand et al. .......... 267/64.26 |
| 4,935,985 A | 6/1990 | Wang ............................. 16/57 |
| 4,973,854 A | 11/1990 | Hummel ................... 267/64.26 |
| 5,009,400 A | 4/1991 | Ott ........................... 267/64.11 |
| 5,094,407 A | 3/1992 | Jampy et al. ........... 244/104 FP |
| 5,129,635 A | 7/1992 | Holley ........................ 267/129 |
| 5,145,206 A | * 9/1992 | Williams |
| 5,158,267 A | 10/1992 | Pascal ...................... 267/64.12 |
| 5,174,552 A | 12/1992 | Hodgson et al. ........ 267/140.11 |
| 5,190,126 A | 3/1993 | Curnutt ........................ 188/269 |
| 5,271,485 A | * 12/1993 | Yowell et al. ............... 188/312 |
| 5,305,981 A | * 4/1994 | Cunningham et al. ...... 248/631 |
| 5,707,044 A | 1/1998 | Le Gourvellec et al. . 267/64.16 |
| 5,826,862 A | 10/1998 | Beck ........................ 267/64.17 |
| 5,878,997 A | 3/1999 | Miesner .................. 267/140.14 |
| 5,947,238 A | 9/1999 | Jolly et al. ................ 188/267.1 |

* cited by examiner

*Primary Examiner*—Douglas C. Butler
(74) *Attorney, Agent, or Firm*—Moore & Van Allen PLLC; Matthew W. Witsil; Michael G. Johnston (57) ABSTRACT

A shock and acoustic mount for reducing transmission of forces between two relatively moveable members such as a mounted component and a supporting structure, providing a compressible fluid spring with large allowable relative movement of the mounted component and support structure. The mount comprises a casing, a piston shell with one end disposed in the casing and another end extending outside of the casing, and a piston housed in the piston shell, all relatively moveable in response to external axial forces. In one embodiment, the mount is filled with a compressible fluid, such as air, providing an air spring. The piston is sealingly bonded to the inner surface of the piston shell, the bond accommodating acoustic and vibration forces by deformation of the bond material. An annular seal between the piston shell and the casing accommodates large and shock forces. In another embodiment, passive damping is provided and a substantially incompressible second fluid is added to the casing, and there is one air spring inside the piston shell. In a third embodiment, an additional air spring is added outside the piston shell, and the response characteristics depend on the type of force applied to the mount.

34 Claims, 7 Drawing Sheets

SHOCK AND ACOUSTIC MOUNT

GOVERNMENT CONTRACT

This invention was made with Government support under Contract N0014-96-C-2079. The Government has certain rights in this invention.

BACKGROUND

The present invention generally relates to the field of acoustic, vibration, and shock motion reduction, and more particularly concerns a mount for reducing the acoustic, vibration, and shock forces transmitted between a mounted component and a support structure.

It is often desirable to mount equipment that generates acoustic and vibration forces to reduce the transmission of these forces into a supporting structure. Mounts typically used for acoustic and vibration isolation include elastomeric, metal spring, and air or gas mounts.

In certain cases these acoustic and vibration mounts must perform the additional function of isolating the mounted equipment from shock loads applied to the supporting structure. Designing the mounts for adequate shock isolation tends to compromise the primary function of acoustic and vibration isolation. For example, use of a low spring rate in the mounting system increases the acoustic and vibration isolation effectiveness. However, this low spring rate will result in correspondingly large deflections during shock events. Conventional mounts have a limited deflection range and may be damaged by shock events unless mitigating measures are taken. These measures include using a higher than optimum spring rate, placing dampers in parallel with the mounts, or using deflection-limiting devices such as "snubbers," which stop motion by impact with a relatively hard material. All of these measures have disadvantages. Higher spring rates reduce acoustic and vibration isolation, additional dampers add weight and complexity, and snubbers produce shock energy on impact.

In some applications the acoustic and vibration mounts must operate effectively over a range of supported weight or with a range of angles to the vertical, or both. For example, submarine deck support mounts are subject to changing loads due to equipment and personnel movement. These deck support mounts must also operate effectively as the submarine changes angles. Designing the mounts for a range of supported weight and angles tends to compromise the primary function of acoustic and vibration isolation. Typically, the mount spring rate is increased to prevent excessive motion during load and angle changes, detrimental to the acoustic and vibration isolation performance of the mount.

Conventional air mounts generally have good acoustic performance, but typically operate at low pressure and therefore are quite large. High-pressure air mounts have been designed but provide reduced acoustic performance and a small deflection range. Conventional elastomeric mounts suffer from internal resonances that reduce acoustic performance and cannot compensate for changing loads or angles.

For the foregoing reasons there is a need for a mount that statically supports mounted equipment while isolating acoustic and vibration forces as well as shock loads to, or from, the mounted equipment. The mount should quickly damp the equipment response. The new mount should also be able to compensate for equipment weight and angle changes and allow for equipment height adjustment. Ideally, the new mount should be compact, which allows use of the mount in applications where the distance between the mounted component and support structure is limited.

SUMMARY

Accordingly, it is an object of the present invention to provide a new mount that has superior performance in isolating acoustic and vibration forces as well as shock loads to or from a mounted component.

Another object of the present invention is to provide a new mount that dampens the amplification of the loads on the mounted component with negligible reduction of the isolation provided.

A further object of the present invention is to provide a new mount that is compact.

A still further object of the present is to provide a new mount that can compensate for equipment weight and angle changes.

Yet another object of the present invention is to provide a new mount that can provides for adjustment of the distance between the mounted component and the support structure.

According to the present invention, a mount is provided for support between first and second relatively movable members, such as a mounted component and a support structure, for reducing vibration and shock transmission between the members. The mount comprises a hollow cylindrical casing, within the casing a hollow cylindrical housing that is a piston shell, a piston disposed in and sealingly bonded to the piston shell, a compressible fluid such as air filling a variable volume chamber defined by the casing, the piston shell, and the piston, and an annular seal between the casing and the piston shell.

The casing has one closed end and one end with an opening, and is attached to the support structure. The piston shell is open at both ends and disposed for axial movement within the casing through the open end of the casing with the annular seal preventing fluid leakage between the casing and housing at the opening. A portion of the piston shell extends outwardly of the open end of the casing. The piston is axially movable relative to the piston shell by deformation of the bond material, which is resilient, and includes a piston rod that extends out of the piston shell and casing to attach to the mounted component.

The compressible fluid acts on the piston shell and piston to urge the piston shell and piston to an axial position relative to the casing. The static friction between the piston shell and annular seal and the stiffness of the bond material between the piston and the piston shell are selected so that only the piston moves relative to the casing in response to axial external forces on the movable members less than a predetermined net force for reducing vibration transmission between the members. The piston shell and piston move together relative to the casing when the static friction between the annular seal and the piston shell is overcome by axial external forces on the movable members greater than the predetermined net force for reducing vibration transmission between the members. A compressible fluid single-acting spring is thereby provided with large allowable relative movement of the support structure and the mounted component.

The present invention may further comprise a raised annular portion on the outer surface of the piston shell. The raised annular portion restricts the space between the outer surface of the piston shell and the inner surface of the casing to define a throttling passage, dividing the cavity into two variable volume chambers filled with a substantially incompressible fluid. The substantially incompressible fluid, such as oil, and an adjacent compressible fluid, such as air, fill inside of the piston shell up to the piston and resilient bond. To provide hydraulic communication through the wall of the piston shell, the piston shell has at least one opening between the raised annular portion and the end of the casing with the opening. A compressible fluid single-acting spring is thereby provided with large allowable relative movement of the mounted component and the support structure, and with damping provided by incompressible fluid flow through the throttling passage.

Also according to the present invention, an additional compressible fluid volume may be provided inside the casing but outside of the piston shell, on the side of the raised annular portion adjacent to the end of the casing with the opening. A double-acting spring is thereby provided.

Further according to the present invention, in addition to a first raised annular portion that creates a throttling passage for damping, a second raised annular portion on the outer surface of the piston shell is provided, disposed between the opening or openings in the piston shell wall and the compressible fluid that is outside of the piston shell. The second raised annular portion restricts the space between the outer surface of the piston shell and the inner surface of the casing to present a relatively restrictive passage for flow of the incompressible fluid, and divides the chamber between the first raised annular portion and the end of the casing with the opening into two chambers. Flow of incompressible fluid through this restrictive passage at a flow rate in excess of a predetermined flow rate substantially prevents hydraulic communication between the compressible fluid volumes inside and outside of the piston shell.

The second raised annular portion of the piston shell is designed to cause the mount to respond differently in cases of acoustic and vibration transmission, shock force transmission, and quasi-static force transmission. The type of force encountered by the mount determines the response characteristics of the two air springs. The compressible fluid spring inside the piston shell alone responds to acoustic and vibration forces. As the result of the flow restriction at the annular orifice, the chamber inside the piston shell is effectively decoupled from the remainder of the casing interior during shock, and each compressible fluid spring independently counteracts the shock force. The compressible fluid springs act together in response to large and relatively slow, quasi-static, forces.

The mount features a sliding seal for use as the annular seal between the casing and the piston shell, and an elastomeric material bonding the piston to the piston shell. A source of compressible fluid may be provided to vary the pressure of the compressible fluid springs, to compensate for changes in load or to adjust the length of the mount. By adding control methods, the mount could be made semi-active. Control methods could include use of a valved bypass to provide fluid communication between ends of the casing around the throttling passage, or use of electrorheological or magnetorheological fluid instead of oil, for example.

The material bonding the piston to the piston shell deforms to provide acoustic and vibration isolation, and the annular seal handles large forces and shock forces, while allowing side loads on the mount. A multi-axis mount system may be provided to include a plurality of uniaxial mounts as components. The mount is compact in size, which results in improved acoustic and vibration response and reduced system weight and cost. Analysis predicts superior performance in acoustic, vibration, and shock isolation over elastomeric-based passive mount systems. The combination of the annular seal and the material that bonds the piston to the piston shell provides both good acoustic and vibration isolation and reduced transmission of shock and other large forces in a compact size.

BRIEF DESCRIPTION OF THE DRAWINGS

For a more complete understanding of this invention reference should now be had to the embodiments illustrated in greater detail in the accompanying drawings and described below.

DESCRIPTION

Figure 1:
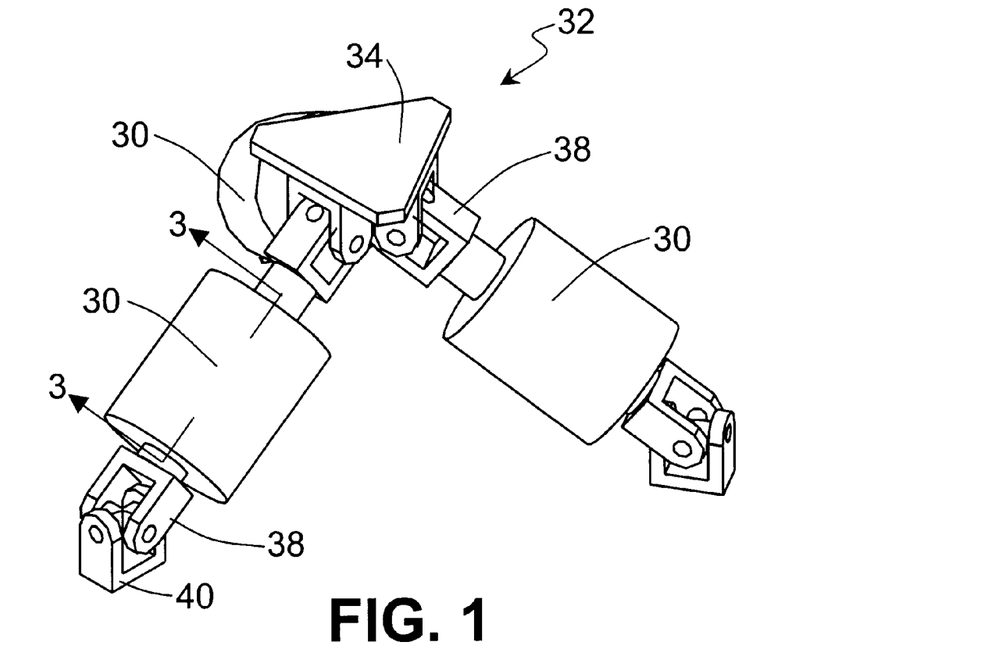
FIG. 1 is a perspective view of a multi-axis mount system according to the present invention.
Figure 2:
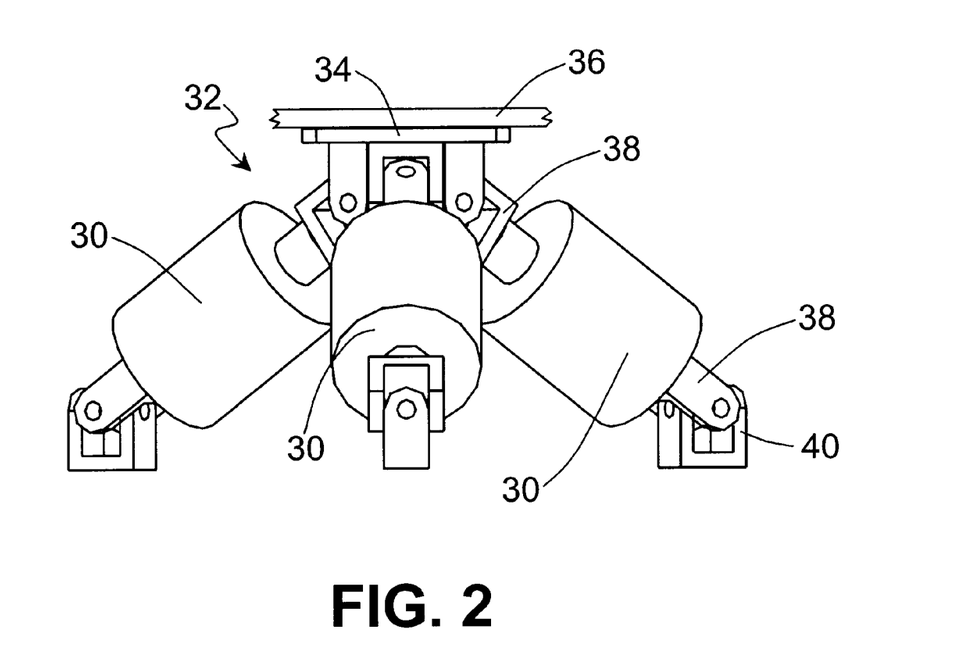
FIG. 2 is an elevation view of the system of FIG. 1, including a portion of a supported platform that is a base for mounted objects.

Turning now to the drawings, a uniaxial mount 30 having features of the present invention is shown in FIGS. 1 and 2, arranged as a component of a multi-axial support system 32 for a base 34. The base 34 may be adapted for mounting equipment, or to support a deck or platform 36 (FIG. 2) that supports equipment. One end of the mount is connected to the base 34. A bracket 40 at the other end of the mount 30 anchors the mount 30 to a supporting structure (not shown). The connections at each end of the mounts 30 are shown as pinned connections 38. Other configurations are possible as well, including those that replace the pinned connections 38 with universal joints, or that use spherical mounts.

Figure 3:
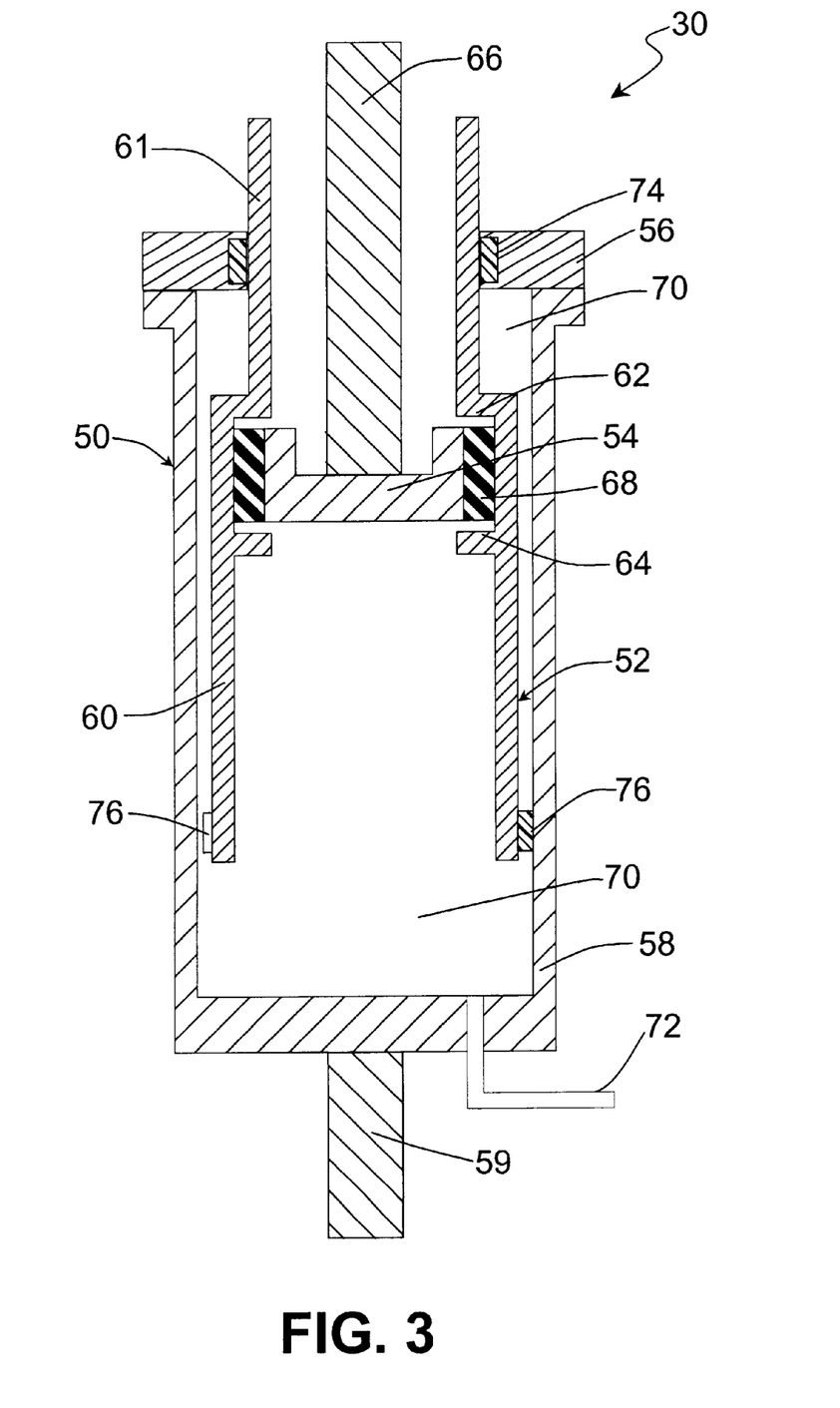
FIG. 3 is a schematic section view of a mount according to the present invention taken along line 3—3 of FIG. 1.

An embodiment of the mount 30 according to the present invention is shown in FIG. 3. The mount 30 comprises a casing 50, a piston shell 52, and a piston 54. The casing 50 has an annular top 56 and a hollow, cylindrical bottom section 58 that is closed at one end. The casing 50 is connected to a shaft 59 that is connected to the bracket 40.

The piston shell 52 is generally a hollow, stepped cylinder that is open at both ends, including a first end portion 60 having a wider diameter than a second end portion 61. A shoulder 62 is formed at the intersection of the first end portion 60 and the second end portion 61. The piston shell 52 is disposed within the casing 50 so that a length of the second end portion 61 extends outwardly of the casing 50 through an opening in the casing top 56. The piston shell 52 is capable of reciprocal linear movement relative to the casing 50.

The piston 54 is cylindrical and is disposed inside the first end portion 60 of the piston shell 52. The piston 54 is connected to a rod 66 that is connected, either directly or indirectly, to a base 34 (not shown) for the supported equipment. A "resilient bond" 68 sealingly bonds the piston 54 to the piston shell 52. The resilient bond comprises an elastomeric ring bonded to the periphery of the piston 54 and to the inner surface of the piston shell 52. This arrangement allows the piston 54 to reciprocate linearly relative to the piston shell 52 due to material deformation of the resilient bond 68. Although the resilient bond 68 is shown comprising an elastomeric ring made of a material such as rubber, other materials may be used, such as one or more metal diaphragms connected between the piston 54 and piston shell 52, as long as the resilient bond 68 permits movement of the piston 54 relative to the piston shell 52. The piston shell 52 includes internal stops on either side of the piston 54. One stop is formed by the shoulder 62 at the intersection of the first end portion 60 and the second end portion 61 of the piston shell 52. The other stop 64 may consist of either a circumferential protrusion or a plurality of intermittently spaced protrusions from the inner surface of the piston shell 52. The stops 62, 64 limit the stroke of the piston 54 when the piston 54 contacts the stops 62, 64 preventing damage to the resilient bond 68 in case of sudden large motions. In normal conditions, which do not include sudden large motions, the piston 54 does not contact the stops 62, 64.

An annular seal 74 is interposed between the outside surface of the piston shell 52 and the inside edge of the casing top 56. The seal 74 is exemplarily a sliding seal. Sliding seals are known to those skilled in the art, and are used between the piston shell 52 and casing top 56 in the present invention because they do not limit the piston 54 stroke.

The casing 50, piston shell 52, piston 54, and bracket 40 are made of steel, but any material of sufficient strength to withstand the forces the mount 30 may encounter in use may be used. The scope of the invention, however, is not intended to be limited by the materials listed herein, but may be carried out using any materials that allow the construction and operation of the described mounts. The casing 50 and the piston shell 52 exemplarily have 0.5-inch thick walls. The dimensions of all of the components of the mount 30, as well as the mechanical characteristics of the elastomeric ring 68 and seal 74, are based on the particular application as may be determined by someone of ordinary skill in the art.

The material of the seal 74 is selected so that small relative motion of the mounted component and the support structure, such as those associated with acoustic and vibration forces, are not sufficient to overcome the static friction between the seal 74 and the piston shell 52. Therefore, in response to acoustic and vibration forces the piston shell 52 does not move relative to the casing 50. A net axial force on the mount 30 is the sum of the forces in the direction of the longitudinal axis of mount 30 caused by relative movement of the mounted component and the support structure. When the net axial force is greater than the static friction of the seal 74 against the piston shell 52, the piston shell 52 will move relative to the casing 50, allowing for large displacements. The stiffness of the resilient bond 68 is high enough that the seal 74 static friction is overcome before the piston 54 impacts the stops 62, 64, except possibly in the case of sudden shock motion. For example, if the seal 74 requires 100 lbf before sliding occurs and if the piston 54 can move 0.1 inch from the neutral, undeformed position before contacting the stops 62, 64, then the stiffness of the resilient bond 68 must be greater than 1,000 lbf/in to ensure that sliding will occur before contact.

In response to forces applied on the mounted equipment relative to the support structure that result in a net axial force that exceeds the static friction between the seal 74 and the piston shell 52, the piston 54 and the piston shell 52 move linearly along the longitudinal axis of the mount relative to the casing 50. To resist the applied forces, the cavity defined by the casing 50 is filled with a compressible fluid 70, which may exemplarily be a gas that is an inert gas such as nitrogen, or as discussed herein, pressurized air. The fluid pressure will vary with the particular application, but is preferably significantly greater than atmospheric pressure. An exemplary range of suitable pressures is from about 500 to about 5,000 pounds per square inch (psi). The mount 30 is pressurized through a pressurized air line 72 connected to the casing 50 and a source of pressurized air. A compensation system may be provided that can vary the internal pressure to compensate for changes in supported equipment weight or platform motion. This system admits air from the source or bleeds it to the atmosphere through the pressurized airline 72, as required, to maintain the supported platform height within a control band. Alternatively, the pressurized airline 72 could include an air valve to allow pressurization to a predetermined pressure, and be automatically controlled. The resilient bond 68 and seal 74 prevent the pressurized air 70 from escaping and maintain the force resistive to movement of the piston 54 and the piston shell 52 created by the pressure.

The mount 30 according to the present invention provides a soft air spring for static support of mounted equipment weight. The resilient bond 68 preferably has lower stiffness than the air spring in order to provide acoustic and vibration isolation. The low spring rate of the resilient bond allows limited reciprocal movement of the piston 54 relative to the piston shell 52 in response to small relative movement of the mounted component. This substantially prevents transfer of acoustic and vibration forces between the supported equipment base 34 and the bracket 40.

To function optimally, the forces exerted by the pressurized air 70 on the piston shell 52, and the piston 54 and resilient bond 68, respectively must be substantially equal so that the resilient bond 68 does not deform excessively under static conditions. The force on the piston shell 52 at seal 74 is the product of the pressure of the air 70 in the casing 50 and the cross-sectional area of the opening through the top of the casing 56 as defined by the outside surface of the second end portion 61 of the piston shell 52, which the inside edge of the seal 74 engages. The force on the piston 54 and resilient bond 68 is the product of the pressure of the air 70 in the casing 50 and the "equivalent effective area" of the piston 54 and resilient bond 68. Because the material of the resilient bond 68 is deformable, the equivalent effective area will be less than the actual combined cross-sectional area of the piston 54 and resilient bond 68, but greater than the cross-sectional area of the piston 54 alone. The equivalent effective area is the area of a sliding seal that would give the same force at the same pressure as the piston 54 and resilient bond 68, and may be calculated based on the resilient bond 68 material by someone of ordinary skill in the art or may be determined by experimentation. Making the equivalent effective area of the piston 54 and rubber bonding 68 the same as the area defined by the seal 74 is facilitated by use of at least two different diameter cylinders 60, 61 in constructing the piston shell 52.

Figure 4:
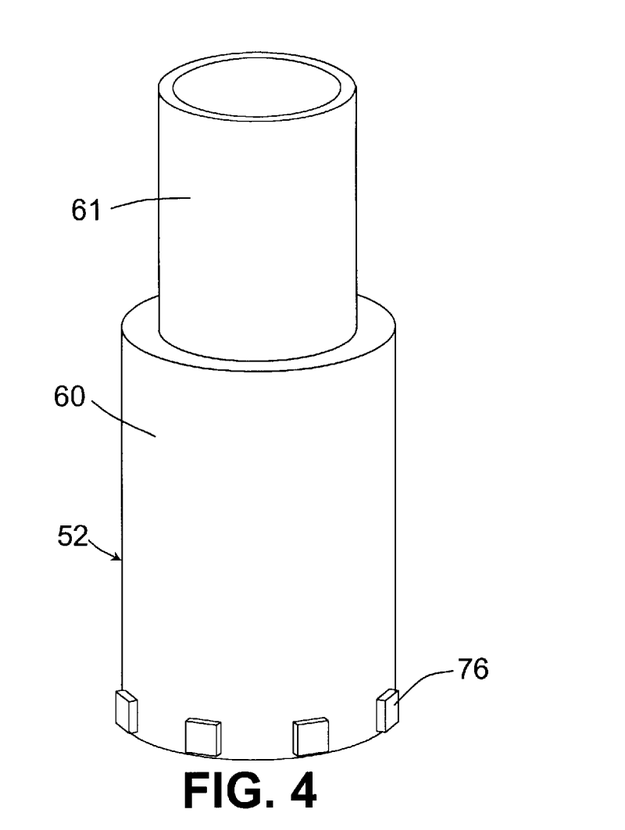
FIG. 4 is a perspective view of a piston shell of the mount shown in FIG. 3.

A bearing 76 is provided for guiding the linear movement of the piston shell 52 in the casing 50. As shown in FIG. 4, the bearing 76 comprises material strips mounted at spaced intervals on the periphery of the piston shell 52. Alternatively, the material strips could be mounted at spaced intervals on the inside surface of the casing 54 so that the strips maintain contact with the outside of the piston shell 52 for the full range of movement of the piston shell 52. The bearing 76 is preferably made from polytetrafluoroethylene (PTFE, marketed as TEFLON®, a registered trademark of E.I. du Pont de Nemours and Company) or other low friction material. The bearing 76 protects the seal 74 from misalignment as the result of side loads, increasing the seal life and effectiveness. The bearing 76 does not provide an alternative path for acoustic or vibration forces around the rubber-bonded piston 54 that could affect the acoustic or vibration isolation effectiveness of the mount 30.

The optimal design of the mount 30 will vary depending on the application. The mount 30 could be designed for a variety of supported loads, spring rates, and maximum deflections. To make the mount 30 effective as an acoustic and vibration isolator, the resonant frequency of the combination of the mount spring stiffness and the mass supported by the spring should be as low as possible. At the same time, the length and weight of the mount must be maintained as low as possible in order to maximize acoustic and vibration performance. Simple relationships between resonant frequency and mount characteristics have been developed to aid the designer. The first step in the development is to derive the spring rate.

Assume that the mount contains an initial air volume $V_i$ with initial pressure $P_i$ that is being compressed by a force of $F_i$ applied by a piston of area S. The goal is to calculate the force F required to compress the air to a final volume V and pressure P as the piston moves from a height of h to h–d, where d is a distance. It is assumed that the force change is rapid enough to make the gas law for adiabatic expansion applicable as follows:

$$PV^n = P_i V_i^n$$

where the adiabatic expansion coefficient, n, is approximately equal to 1.4 for air. Substituting the relationships $F_i = P_i S$, $F = PS$, $V_i = Sh$, $V = S(h-d)$, and solving for F gives the final force applied to the spring as $$F = F_i \left(\frac{S(h-d)}{Sh}\right)^{-n} = F_i \left(1 - \frac{d}{h}\right)^{-n}$$

Taking the derivative with respect to d gives the equation for spring rate k as:

$$k = \frac{F_i n}{h}\left(1 - \frac{d}{h}\right)^{-(n+1)}$$

The resonant frequency $f_r$ of a spring-mass system when supporting a mass of $F_i/g_c$ is equal to:

$$f_r = \frac{1}{2\pi}\sqrt{\frac{kg_c}{F_i}}$$

where $g_c$ is the gravitational acceleration constant of 32.2 ft/sec$^2$. Substituting the initial spring rate (d=0) and solving for h gives:

$$h = \frac{ng_c}{(2\pi f_r)^2}$$

Figure 5:
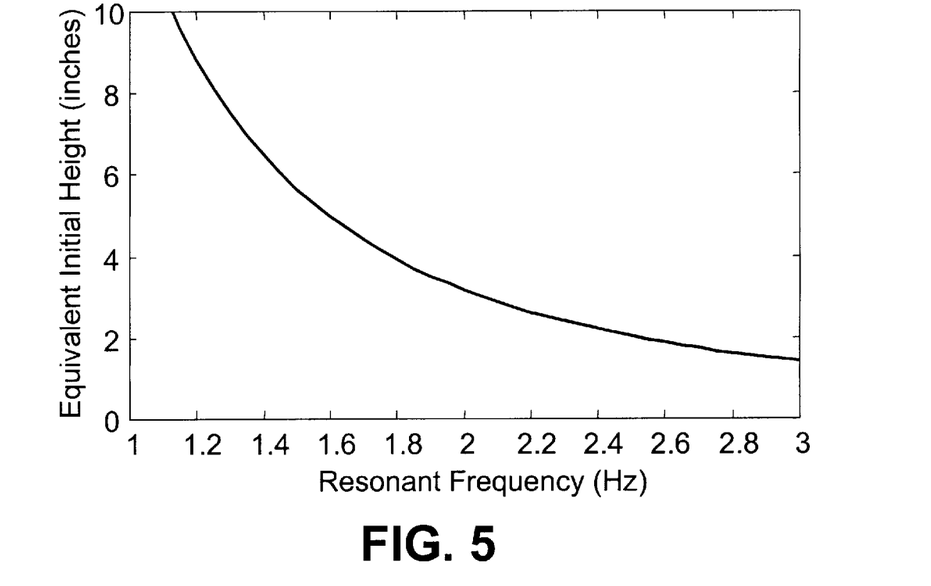
FIG. 5 is a graph of equivalent initial height of a mount as a function of resonant frequency, which is used in design of the mount shown in FIG. 3.

For a simple piston with constant cross-sectional area equal to that of the cylinder inside cross-sectional area, h is the required mount air column height, which is the distance between the inside surface of the piston and the bottom end of the casing. For the mount 30 of the present invention, h is an equivalent mount air column height that is equal to V/S. The casing 50 can be changed in its shape or in its height, or an additional air reservoir can be added that is hydraulically connected to the casing 50, so long as the correct volume V is maintained for the piston cross-sectional area S to produce the required equivalent mount air column height h. The required h for a typical desired resonant frequency range of 1 to 3 Hz is plotted in FIG. 5.

After the required equivalent air column height is set, the mount operating pressure and the outside diameter of the piston shell 52 second end portion 61 are determined. The product of the cross-sectional area defined by the outside surface of the second end portion 61 of the piston shell 52 and the operating pressure must support the static load of the supported equipment. A prospective exemplary design to support a load of 24 klbf would have a piston shell second end portion 61 outside diameter of 4 inches and operate at a pressure of 1,900 psi. The overall mount size for this example would be approximately 7 inches in diameter by 18 inches long. There is a tradeoff between piston shell 52 area and operating pressure that must consider several factors. High pressure increases the vessel and seal design requirements. Low pressure increases the mount size and weight. If height is to be controlled, pressure variability must be within the capability of the chosen air supply compensation system. Next, the piston 54 and resilient bond 68 areas are determined based on the desired characteristics for acoustic and vibration force response and on the required equivalent effective area, as previously discussed.

Figure 6:
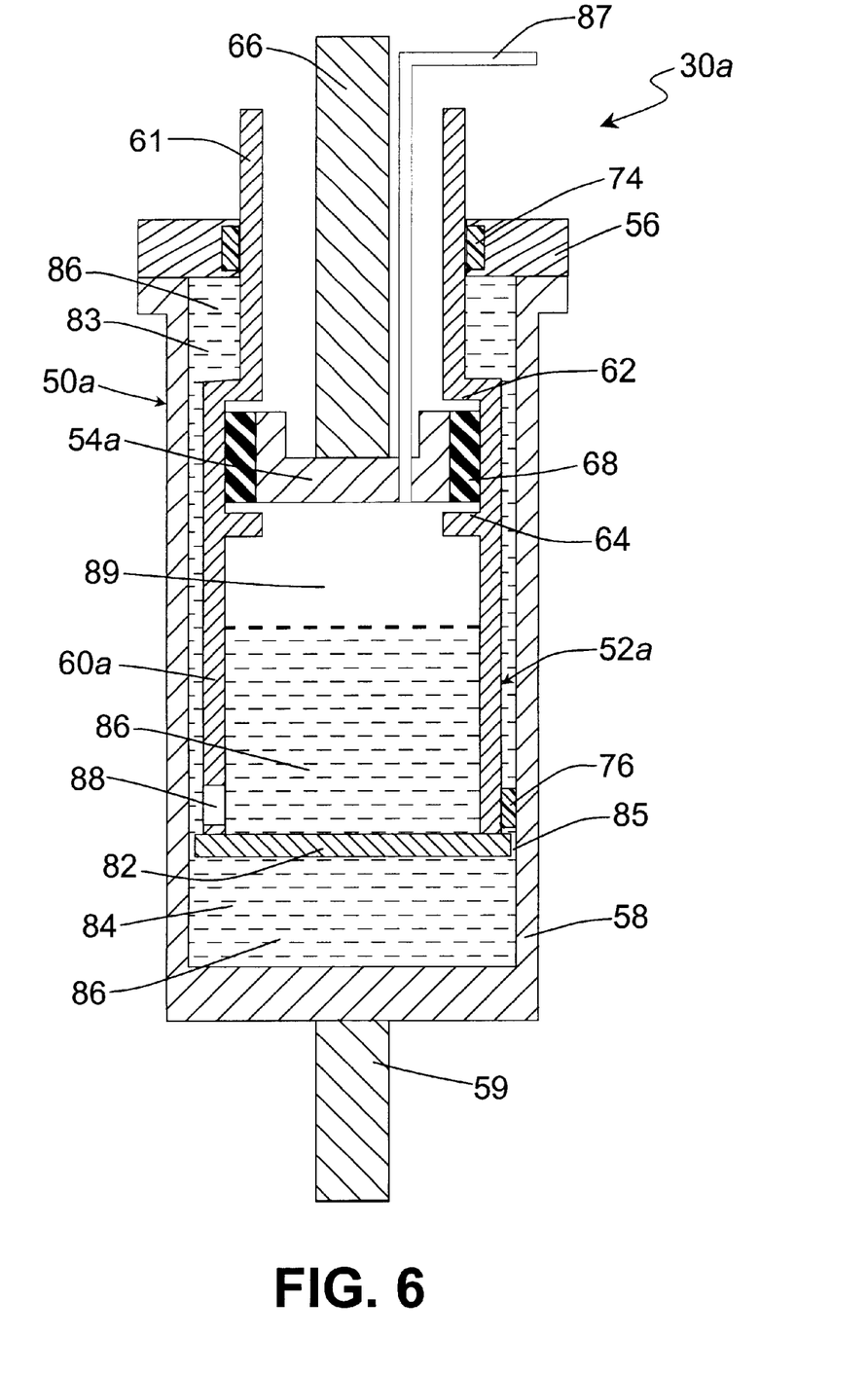
FIG. 6 is a schematic section view of another embodiment of a mount according to the present invention, taken along line 3—3 of FIG. 1.

FIG. 6 shows another embodiment of a mount 30*a* according to the present invention. In the figures herein, unique features receive unique numbers, while features that are the same in more than one drawing receive the same numbers throughout. Where a feature is modified between figures, a letter is added or changed after the feature number to distinguish that feature from a similar feature in a previous figure. In this embodiment 30*a*, the first end portion 60*a* of the piston shell 52*a* is closed, forming a damping piston face 82 that divides the inside of the casing 50*a* outside the piston shell 52*a* into an upper chamber 83 and a lower chamber 84. The periphery of the piston face 82 and inner surface of the casing 50*a* define an annular void 85.

A substantially incompressible fluid, exemplarily a hydraulic fluid 86 that is viscous, such as oil, fills the casing 50*a* outside the piston shell 52*a*. When the damping piston shell 52*a* moves relative to the casing 50*a*, the oil 86 flow through the annular void 85 generates a force that resists motion of the piston shell 52*a*. Although it would be at a significantly lower level, damping could be provided by a compressible fluid such as air alone with an appropriately sized annular void 85. The seal 74, resilient bond 68, and air spring operate as in the mount 30 without damping, where the volume, V, in the previously discussed equations is that of the air alone, S is the piston cross-sectional area, and h is the equivalent mount air column height equal to V/S.

The mount 30a may be pressurized by a source of pressurized compressible fluid though a pressure line 87 that passes through the piston 54a. Pressure must be adequate to prevent fluid cavitation as the piston 54a moves upward at maximum force. Like the previously described embodiment of the mount 30, this mount 30a may be connected to a compensation system that can vary the internal pressure to compensate for changes in supported equipment weight or platform motion. This pressurized airline 87 could also include an air valve to allow pressurization to a predetermined pressure, and automatic controls.

Figure 7:
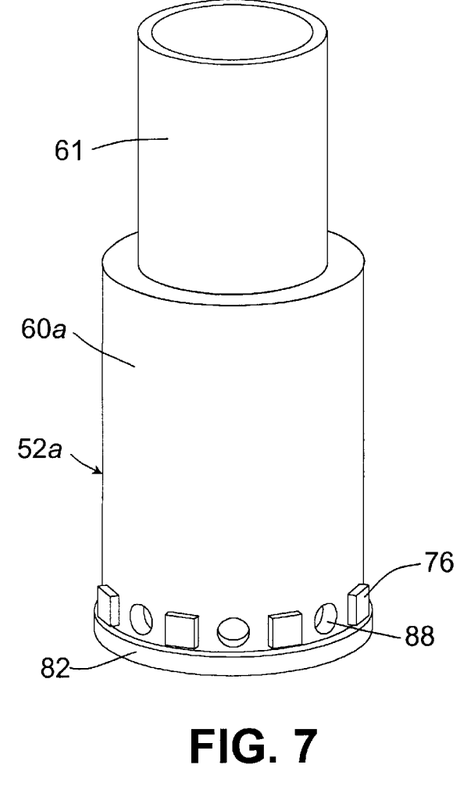
FIG. 7 is a perspective view of a piston shell of the mount shown in FIG. 6.

As shown in FIG. 7, the piston shell 52a may be provided with holes 88 between the bearings 76, which allows fluid communication with the inside of the casing 50a. The inside of the piston shell 52a is partially filled with oil 86 and the remainder with a 30 volume of air 89. The holes 88 are designed so as to only insignificantly restrict flow of oil 86 in and out of the piston shell 52a. This helps avoid failure due to overpressurization of the seal 74 in case of shock by providing relatively unrestricted fluid communication between the seal 74 and the compressible air volume 89, which acts as a spring.

As an alternative to holes 88, the damping piston face 82 could be mounted spaced from the end of the piston shell 52a, creating an opening between the end of the piston shell 52a and the piston face 82 to allow the same hydraulic communication.

There are numerous ways that damping could be provided as known to those of ordinary skill in the art, so long as flow of oil 86 is throttled through passages designed to restrict flow. Examples include using a closed end piston shell and a ring axially located along the piston shell at any location below the holes 88 to restrict oil 86 flow between the piston shell and casing 50a, rather than using a damping piston face 82. The ring could be mounted to the casing 50a instead of the piston shell. The throttling passage could be provided by holes through a damping piston face, outside the limits of the piston shell, rather than by an annular throttling passage between the casing 50a and the piston shell 52a.

The holes 88 in the piston shell 52a must remain submerged in oil 86 for proper operation, because air 89 must not be allowed to escape from the piston shell 52a into the casing 50a. The mount 30a may operate at angles away from vertical, as shown in the system 32 in FIG. 1. Tilting of the base to which the mount 30a is attached may also increase the angle away from vertical. Operation at extreme angles that allow the air 89 to escape from the piston shell 52a through the holes 88 or other features that allow air 89 to pass through the piston shell 52a will cause the mount 30a to malfunction. The angles at which this will occur depend on the dimensions of the particular mount. The depth of the damping piston face 82 below the oil 86 must also be considered in design based on expected operation angles.

The mount 30a of the present invention can be modified by those skilled in the art to provide semi-active control capability for improved effectiveness. Control methods could include a valved bypass to provide controlled fluid communication between the ends of the casing on either side of the damping piston face 82, or use of electrorheological or magnetorheological fluid instead of the oil 86. For example, such a design is disclosed in U.S. Pat. No. 5,878, 997 to Miesner, the contents of which are hereby incorporated by reference.

The performance of this mount can be estimated using the same equations as previously derived for the mount 30 without damping. The effect of damping may also be calculated; equations for damping may be derived by someone of ordinary skill in the art.

Figure 8:
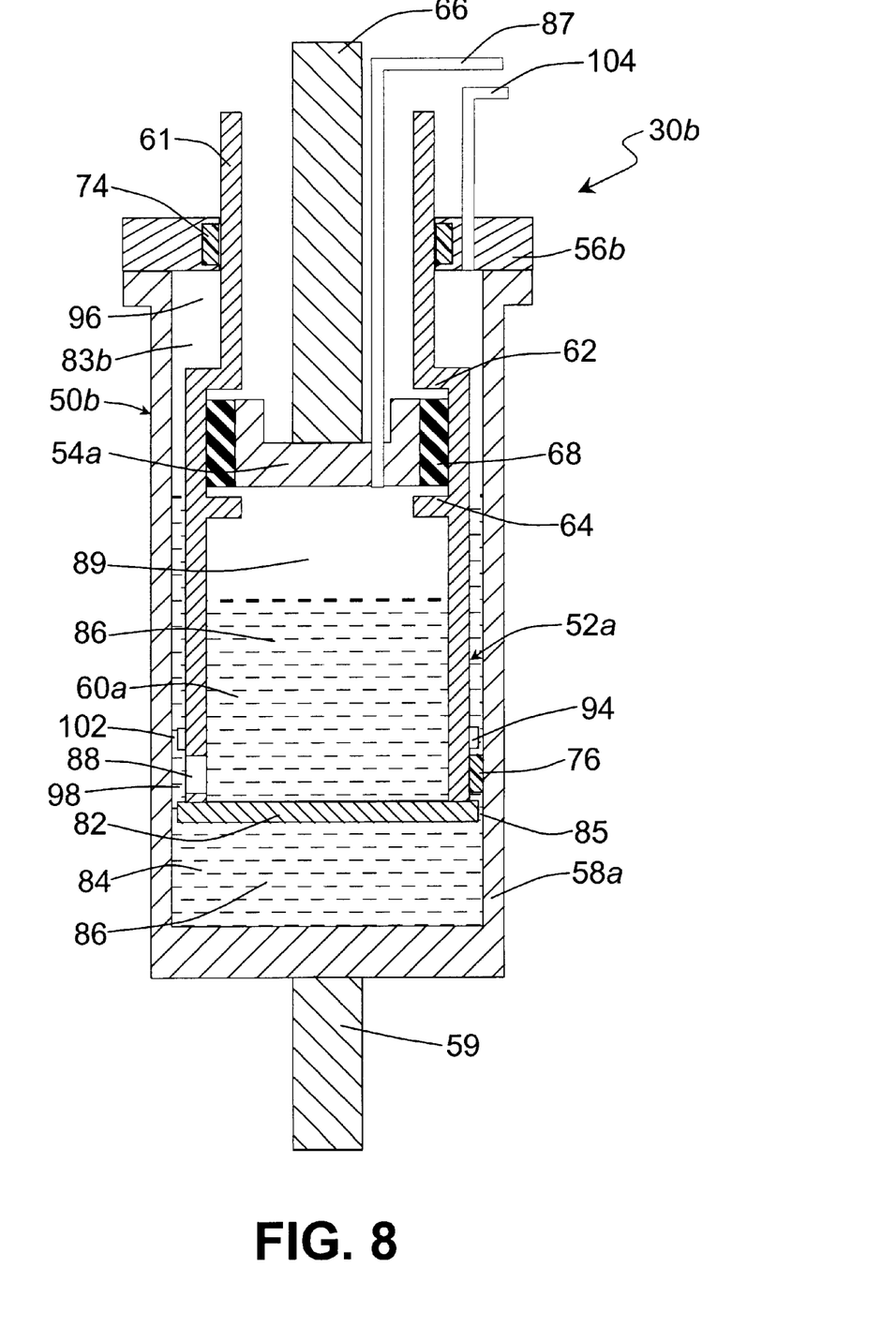
FIG. 8 is a schematic section view of still another embodiment of a mount according to the present invention, taken along line 3—3 of FIG. 1.
Figure 9:
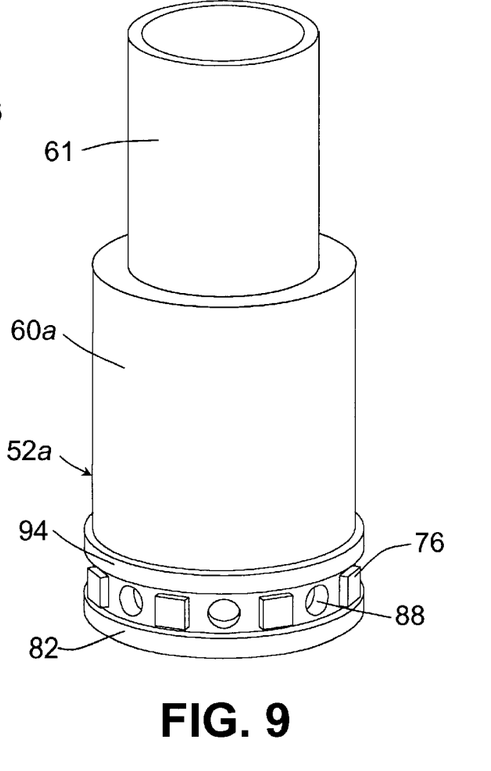
FIG. 9 is a perspective view of a piston shell of the mount shown in FIG. 8.

FIG. 8 shows a third embodiment of a mount 30b according to the present invention. In this embodiment, a ring 94 (FIG. 9) is mounted to the outside surface of the piston shell 52a above the damping piston face 82 and the holes 88. The periphery of the ring 94 and the inner surface of the casing 50b define a restrictive annular orifice 102. The ring 94 could alternatively be attached to the casing 50b, with the annular orifice 102 formed between the inner surface of the ring 94 and the outside surface of the piston shell 52a. The ring 94 divides the inside of the casing 50b outside of the piston shell 52b and above the damping piston face 82, which is the upper chamber defined by the damping piston face 82, into a middle chamber 98 and a smaller upper chamber 83b.

A substantially incompressible fluid, exemplarily a hydraulic fluid 86 that is viscous, such as oil, fills the lower chamber 84, the middle chamber 98, and a portion of the upper chamber 83b. The remainder of the upper chamber 83b is filled with a compressible fluid such as air 96. The ring 94 must remain submerged in oil 86 for proper operation, because the ring 94 operates by restricting the flow of oil 86 at the annular orifice 102. Placement of the ring 94 as low, i.e., as close to the free end of the first end portion 60a of the piston shell 52a inside the casing 50b, as possible will help to keep the ring 94 submerged and allow operation of the mount 30b over a large range of operating angles. As with the previously described embodiment of a mount 30a, the holes 88 in the piston shell 52a must remain submerged in oil for proper operation, and in addition, the damping piston face 82 must remain submerged in oil because the damping piston face 82 operates by restricting the flow of oil 86 at the annular void 84. In this embodiment of the mount 30b of the present invention, submergence of the ring 94 assures submergence of the holes 88 and the damping piston face 82. The mount 30b may operate at angles away from vertical, as shown in the system 32 in FIG. 1. The depth of the ring 94 below the oil 86 must be considered in design based on expected operation angles.

This mount 30b may be pressurized though a pressure line 87 that passes through the piston and a pressure line 104 that passes through the casing top 56b. Like the previously discussed mounts 30, 30a, this mount 30b may be connected to a compensation system and the pressurized air lines 87, 104 could also be replaced with air valves to allow pressurization to a set pressure.

The previously described embodiments of the mount 30, 30a of the present invention are single-acting air springs, in that they effectively have only one air chamber. The mount 30b shown in FIG. 8 has two separate air volumes 89, 96, and accordingly is a double-acting spring. The added air volume 96 increases the spring rate of the mount 30b in the upward direction, reducing rebound and improving the shock isolation performance of the mount 30b. More specifically, the type of relative motion between the rod 66 and the shaft 59 governs the mount response.

For small rapid, relative motions between the mounted component and the support structure associated with acoustic forces and vibration, the mount 30b appears as an air spring with the resilient bond 68 in parallel. The air spring volume that governs the acoustic and vibration response is that of the air volume 89 within the piston shell 52a. The ring 94 substantially prevents flow of oil 86 flow between the upper chamber 83b and middle chamber 98 at acoustic and vibration frequencies. The air volume 96 in the upper chamber 83b does not participate to any significant degree. The equations derived previously for the spring rate, resonant frequency, and initial mount air column height of the other detailed embodiments 30, 30a apply to this mount 30b with respect to acoustic and vibration response.

For large, slow, quasi-static motions, the air volume 94 in the upper chamber 83b and the air volume 89 in the piston shell 52a operate together with pressure equalized across the orifice 102. The effective volume of the air spring includes the air volumes 96, 89 in both the upper chamber 83b and the piston shell 52a.

For large fast motions, as with shock, air volume 94 in the upper chamber 83b and the air volume 89 with the piston shell 52a are effectively decoupled at the orifice 102 and operate as independent air springs that together oppose the motion. This greatly increases the rebound stiffness and reduces the displacement in the upward direction. The flow rate of oil 86 flowing through the orifice 102 required to adequately reduce pressure to decouple the upper chamber 83b and middle chamber 98 for a given shock force is used to set the size of the orifice 102, and may be calculated by someone of ordinary skill in the art.

To calculate the spring rate of the mount 30b for shock, assume that the mount contains upper and lower initial air volumes, the upper air volume $V_{ui}$ being the air volume 96 in the upper chamber 83b with an initial equivalent height of $h_{ui}$, and the lower air volume $V_{li}$ being the air volume 89 in the piston shell 52a with an initial equivalent height of $h_{li}$, with both at initial pressure $P_{in}$. The lower air volume 89 inside the piston shell 52a communicates relatively freely with the middle chamber 98. Assume that a large downward force is applied to piston rod 66 causing the piston 54a to contact the stop 64 and the piston shell 52a to be forced downward. The lower air volume 89 is compressed by the fluid flowing from under damping piston face 82, which is area $S_l$. The upper air volume 96 is being expanded by an area $S_u$, defined by the difference between the cross-sectional area of the damping piston face 82 and that of the inside edge of seal 74. The goal is to calculate the force F required to compress the air to final volumes $V_u$ and $V_l$ with respective pressures $P_u$ and $P_l$ as the piston shell 52a moves from an initial equivalent height of $h_{li}$ to $h_{li}$-d. It is assumed that the force change is rapid enough to make the gas law for adiabatic expansion applicable as follows:

$$P_l V_l^n = P_{in} V_{li}^n$$

$$P_u V_u^n = P_{in} V_{ui}^n$$

Substituting the following relationships:

$$F = S_l P_l - (S_l - S_u) P_u$$

$$V_{li} = S_l h_l$$

$$V_{ui} = (S_l - S_u) h_u$$

$$V_l = S_l (h_l - d)$$

$$V_u = (S_l - S_u)(h_u + d)$$

and solving for F gives the final force on the spring as $$F = S_l P_{in} \left(\frac{h_l - d}{h_l}\right)^{-n} - (S_l - S_u) P_{in} \left(\frac{h_u + d}{h_u}\right)^{-n}$$

Taking the derivative with respect to d gives the equation for spring rate k as:

$$k = F_{in} \left[\frac{S_l}{S_u(h_l - d)}\left(\frac{h_l - d}{h_l}\right)^{-n} + \left(\frac{S_l - S_u}{S_u(h_u + d)}\right)\left(\frac{h_u + d}{h_u}\right)^{-n}\right]$$

Setting d=0 gives the equation for initial spring rate k as:

$$k = F_{in}\left[\frac{S_l(h_l + h_u)}{S_u h_l h_u} - \left(\frac{1}{h_u}\right)\right]$$

Figure 10:
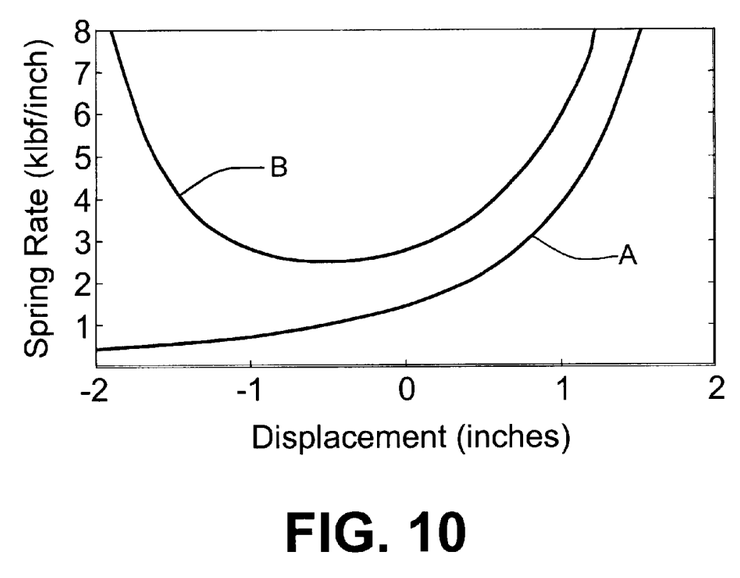
FIG. 10 is a graph of the predicted spring rate for the mount shown in FIG. 8.

The resulting spring rate for shock motion in the mount 30b with the double-acting air spring is shown in FIG. 10 as curve A and may be compared to the spring rate applicable to acoustic and vibration motions for the mount 30b, shown as curve B. The spring rate applicable to acoustic and vibration motions, curve B, is the same as that for the other mount designs 30, 30a disclosed herein, where volume is that of the lower air volume 89.

To calculate the spring rate and initial height of the mount 30b for quasi-static motion, the equations derived previously herein for the two other embodiments 30, 30a and for acoustic and vibration response of the double-acting mount 30b must be modified to reflect the total volume of the upper and lower air volumes 96, 89 rather than just the lower air volume 89.

Figure 11:
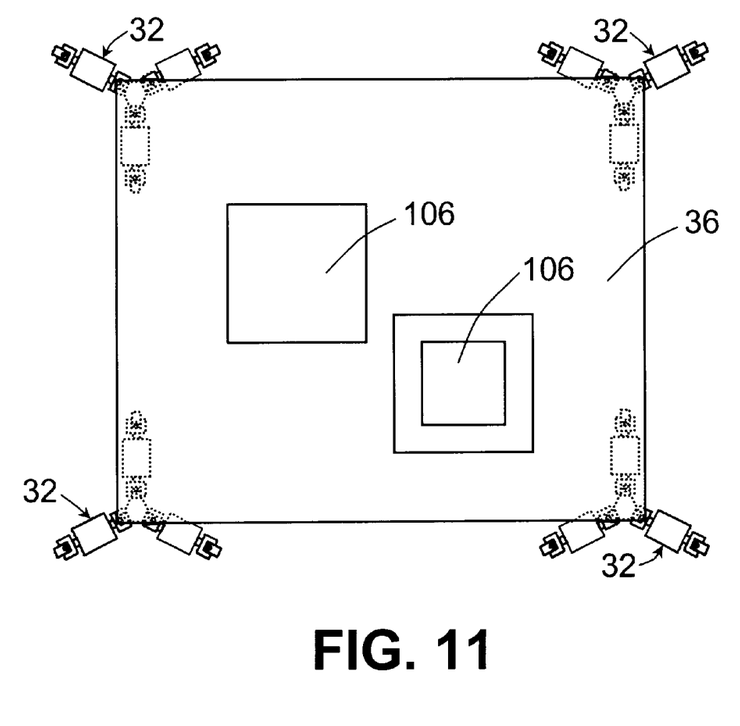
FIG. 11 is a plan view of several multi-axis mount systems as shown in FIG. 1 supporting a platform that is a base for mounted objects.

The mount system of the present invention has many applications for acoustic, vibration, and shock isolation, including on submarines. Improved shock mounting of a submarine deck may allow a reduced number of equipment mounts and a decrease in costs. For example, in FIG. 11, four of the systems 32 support a platform 36 for mounted equipment 106. The configuration shown provides independent support from each system 32.

Many variations of the embodiments disclosed herein are feasible and within the scope of this invention. For example, the sliding seal 74 can be moved below the piston 54, 54a, shortening the casing bottom section 58, 58a. In such a case, an additional bearing to provide lateral support to and guide the piston shell 52, 52a would likely be needed above the resilient bond 68. This configuration might be selected where there are significant side loads, as the piston shell 52, 52a would be supported by at least one bearing above and one bearing 76 below the seal 74. Alternatively, a bearing and guide could be added to the piston shell 52, 52a or shaft 66 externally to any of the embodiments 30, 30a, 30b that are described in detail herein. Other geometric changes may be made as well.

The present invention has many advantages, including providing a mount that allows for both high deflection and good acoustic and vibration isolation in a compact size. Performance simulation indicates significant acoustic, vibration, and shock isolation advantages over elastomeric-based passive mount systems. The new mount is also significantly more compact than several current options due to high-pressure operation. The compact design saves space and also raises the frequency of any internal resonances to further improve the acoustic and vibration performance. These mount performance improvements result in system weight and cost savings since the shock, acoustic, and vibration requirements for mounted equipment are correspondingly reduced. The present invention may be used in a compact multi-axis mount system that incorporates a gas mount and passive damping, and provides for semi-active control.

What is claimed is:

1. A mount for providing support between first and second relatively movable members and reducing vibration and shock transmission between the members, the mount comprising:

a hollow cylindrical casing having a longitudinal axis, a first closed end and a second end having an opening, the casing adapted to be attached to the first movable member;

a hollow cylindrical housing open at both ends and disposed for axial movement within the casing through the opening in the second end of the casing, a portion of the housing extending outwardly of the opening;

a piston disposed in the housing and sealingly bonded to the inner surface of the housing so that the piston is axially movable relative to the housing by deformation of the bond material, the piston including a piston rod having an end portion extending outwardly of the housing and adapted to be attached to the second movable member;

a compressible fluid filling a variable volume chamber defined by the casing, the housing, and the piston; and an annular seal radially interposed between the inside edge of the opening in the second end of the casing and the outer surface of the housing for sealing against fluid leakage between the casing and housing, wherein the housing and piston are acted on by the compressible fluid to urge the housing and piston to an axial position relative to the casing, and the static friction between the housing and annular seal and the stiffness of the bond material between the piston and the housing are selected so that only the piston moves relative to the casing in response to axial external forces on the movable members less than a predetermined net force for reducing vibration transmission between the members, and the housing and piston move together relative to the casing when the static friction between the annular seal and the housing is overcome by axial external forces on the movable members greater than the predetermined net force for reducing vibration transmission between the members, whereby a compressible fluid spring is provided with large allowable relative movement of the movable members.

2. A mount as recited in claim 1, wherein the housing includes two axially spaced stops mounted on the inside surface of the housing, one stop disposed on and spaced from each side of the piston, and each stop having a surface engagable with a surface on the piston to provide a positive stop limiting the range of axial movement of the piston relative to the housing.

3. A mount as recited in claim 1, wherein the bond between the piston and the inner surface of the housing comprises an elastomeric material mounted to the piston and to the inner surface of the housing.

4. A mount as recited in claim 1, wherein the annular seal is a sliding seal.

5. A mount as recited in claim 1, wherein the compressible fluid is a gas.

6. A mount as recited in claim 5, wherein the gas is air.

7. A mount as recited in claim 1, wherein the housing comprises at least two longitudinally adjacent cylinders of differing diameters.

8. A mount as recited in claim 1, wherein the outside surface of the housing where the housing passes through the annular seal has a first cross-sectional area, the piston and the bond sealing against fluid leakage between the piston and the inner surface of the housing have a second area, the second area being the equivalent effective area of the piston and the bond, the equivalent effective area being the cross-sectional area defined by the inside edge of a sliding seal that would receive the same force at the same pressure as the piston and bond, and the first area and the second area are substantially equal, whereby the compressible fluid exerts substantially equal forces on the housing and on the piston and bond.

9. A mount as recited in claim 1, further comprising a source of pressurized gas in hydraulic communication with the inside of the casing for adjusting the pressure inside the casing in response to load changes or a need to change the distance between the first and second members.

10. A mount for providing support between first and second relatively movable members and reducing and damping vibration and shock transmission between the members, the mount comprising:

a hollow cylindrical casing having a longitudinal axis, a first closed end and a second end having an opening, the casing adapted to be attached to the first movable member;

a hollow cylindrical housing having a first closed end and a second open end, the housing disposed for axial movement within the casing through the opening in the second end of the casing such that the closed end of the housing extends into a cavity defined by the casing and the open end of the housing extends outwardly of the second end of the casing, the outer surface of the housing being radially spaced from the inner surface of the casing;

a substantially incompressible fluid filling the cavity outside the housing;

a raised annular portion on the outer surface of the housing for restricting the space between the outer surface of the housing and the inner surface of the casing to define a throttling passage, the raised annular portion dividing the cavity into a first variable volume chamber between the raised annular portion and the second end of the casing and a second variable volume chamber between the raised annular portion and the first end of the casing;

a piston disposed in the housing and sealingly bonded to the inner surface of the housing so that the piston is axially movable relative to the housing by deformation of the bond material, the piston including a piston rod having an end portion extending outwardly of the open end of the housing and adapted to be attached to the second movable member, the piston and the inner surface of the closed end of the housing defining a third chamber;

an annular seal radially interposed between the inside edge of the opening in the second end of the casing and the outer surface of the housing for sealing against fluid leakage from the cavity between the casing and housing; and a substantially incompressible fluid and an adjacent compressible fluid filling the third chamber, the housing having at least one opening between the raised annular portion of the housing outer surface and the second end of the casing for providing hydraulic communication between the first and third chambers and allowing through-flow of incompressible fluid, wherein the housing and piston are acted on by the fluids to urge the housing and piston to an axial position relative to the casing, and the static friction between the housing and annular seal and the stiffness of the bond material between the piston and the housing are selected so that only the piston moves relative to the casing in response to axial external forces on the movable members less than a predetermined net force for reducing vibration transmission between the members, and the housing and piston move together relative to the casing when the static friction between the seal and the housing is overcome by axial external forces on the movable members greater than the predetermined net force for reducing vibration transmission between the members, whereby a compressible fluid spring is provided with large allowable relative movement of the movable members and damping is provided by incompressible fluid flow through the throttling passage.

11. A mount as recited in claim 10, wherein the housing includes two axially spaced stops mounted on the inside surface of the housing, one stop disposed on and spaced from each side of the piston, and each stop having a surface engagable with a surface on the piston to provide a positive stop limiting the range of axial movement of the piston relative to the housing.

12. A mount as recited in claim 10, wherein the bond between the piston and the inner surface of the housing comprises an elastomeric material mounted to the piston and to the inner surface of the housing.

13. A mount as recited in claim 10, wherein the annular seal is a sliding seal.

14. A mount as recited in claim 10, wherein the compressible fluid is a gas.

15. A mount as recited in claim 14, wherein the gas is air.

16. A mount as recited in claim 10, wherein the housing comprises at least two longitudinally adjacent cylinders of differing diameters.

17. A mount as recited in claim 10, wherein the outside surface of the housing where the housing passes through the annular seal has a first cross-sectional area, the piston and the bond sealing against fluid leakage between the piston and the inner surface of the housing have a second area, the second area being the equivalent effective area of the piston and the bond, the equivalent effective area being the cross-sectional area defined by the inside edge of a sliding seal that would receive the same force at the same pressure as the piston and bond, and the first area and the second area are substantially equal, whereby the compressible fluid exerts substantially equal forces on the housing and on the piston and bond.

18. A mount as recited in claim 10, further comprising a source of pressurized gas in hydraulic communication with the third chamber for adjusting the pressure inside the third chamber in response to load changes or a need to change the distance between the first and second members.

19. A mount as recited in claim 10, wherein the incompressible fluid is selected from the group consisting of an oil, an electrorheological fluid, and a magnetorheological fluid.

20. A mount as recited in claim 10, further comprising a valved bypass line that provides fluid communication between the first and second chambers.

21. A mount as recited in claim 20, further comprising a system for controlling the flow of the incompressible fluid through the valved bypass line by automatic manipulation of the valve.

22. A mount for providing support between first and second relatively movable members and reducing and damping vibration and shock transmission between the members, the mount comprising:

a hollow cylindrical casing having a longitudinal axis, a first closed end and a second end having an opening, the casing adapted to be attached to the first movable member;

a hollow cylindrical housing having a first closed end and a second open end, the housing disposed for axial movement within the casing through the opening in the second end of the casing such that the closed end of the housing extends into a cavity defined by the casing and the open end of the housing extends outwardly of the second end of the casing, the outer surface of the housing being radially spaced from the inner surface of the casing;

a first raised annular portion on the outer surface of the housing for restricting the space between the outer surface of the housing and the inner surface of the casing to define a throttling passage, the first raised annular portion dividing the cavity into a first variable volume chamber between the first raised annular portion and the second end of the casing, and a second variable volume chamber between the first raised annular portion and the first end of the casing;

a substantially incompressible fluid filling the first chamber;

a substantially incompressible fluid and an adjacent compressible fluid filling the second chamber;

an annular seal radially interposed between the inside edge of the opening in the second end of the casing and the outer surface of the housing for sealing against fluid leakage from the cavity between the casing and housing;

a piston disposed in the housing and sealingly bonded to the inner surface of the housing so that the piston is axially movable relative to the housing by deformation of the bond material, the piston and the inner surface of the closed end of the housing defining a third chamber, the piston including a piston rod having an end portion extending outwardly of the open end of the housing and adapted to be attached to the second movable member; and a substantially incompressible fluid and an adjacent compressible fluid filling the third chamber, the housing having at least one opening axially between the raised annular portion of the housing outer surface and the second end of the casing for providing hydraulic communication between the first and third chambers and allowing through-flow of incompressible fluid, wherein the housing and piston are acted on by the fluids to urge the housing and piston to an axial position relative to the casing, and the static friction between the housing and annular seal and the stiffness of the bond material between the piston and the housing are selected so that only the piston moves relative to the casing in response to axial external forces on the movable members less than a predetermined net force for reducing vibration transmission between the members, and the housing and piston move together relative to the casing when the static friction between the seal and the housing is overcome by an axial external force on the movable members greater than the predetermined net force for reducing vibration transmission between the members, whereby a compressible fluid spring is provided with large allowable relative movement of the movable members and damping is provided by the incompressible fluid flow through the throttling passage.

23. A mount as recited in claim 22, further comprising a second raised annular portion on the outer surface of the housing for restricting the space between the outer surface of the housing and the inner surface of the casing to present a relatively restrictive passage for flow of the incompressible fluid, the second raised annular portion axially interposed between the at least one opening in the housing and the compressible fluid in the first chamber and dividing the first chamber into a fourth variable volume chamber between the second raised annular portion and the second end of the casing and a fifth chamber between the second raised annular portion and the first raised annular portion, wherein incompressible fluid flows through the restrictive passage when the static friction between the seal and the housing is overcome by an axial external force on the movable members greater than the predetermined net force and causing flow of incompressible fluid through the restrictive passage at a flow rate in excess of a predetermined flow rate, which substantially prevents hydraulic communication between the compressible fluid in the fourth chamber and the compressible fluid in the third chamber.

24. A mount as recited in claim 23, wherein the housing includes two axially spaced stops mounted on the inside surface of the housing, one stop disposed on and spaced from each side of the piston, and each stop having a surface engagable with a surface on the piston to provide a positive stop limiting the range of axial movement of the piston relative to the housing.

25. A mount as recited in claim 23, wherein the bond between the piston and the inner surface of the housing comprises an elastomeric material mounted to the piston and to the inner surface of the housing.

26. A mount as recited in claim 23, wherein the annular seal is a sliding seal.

27. A mount as recited in claim 23, wherein the compressible fluid is a gas.

28. A mount as recited in claim 27, wherein the gas is air.

29. A mount as recited in claim 23, wherein the housing comprises at least two longitudinally adjacent cylinders of differing diameters.

30. A mount as recited in claim 23, wherein the outside surface of the housing where the housing passes through the annular seal has a first cross-sectional area, the piston and the bond sealing against fluid leakage between the piston and the inner surface of the housing have a second area, the second area being the equivalent effective area of the piston and the bond, the equivalent effective area being the cross-sectional area defined by the inside edge of a sliding seal that would receive the same force at the same pressure as the piston and bond, and the first area and the second area are substantially equal, whereby the compressible fluid exerts substantially equal forces on the housing and on the piston and bond.

31. A mount as recited in claim 23, further comprising a source of pressurized gas in hydraulic communication with the third and fourth chambers for adjusting the pressure inside the third and fourth chambers in response to load changes or a need to change the distance between the first and second members.

32. A mount as recited in claim 23, wherein the incompressible fluid is selected from the group consisting of an oil, an electrorheological fluid, and a magnetorheological fluid.

33. A mount as recited in claim 23, further comprising a valved bypass line that provides fluid communication between the first and second chambers.

34. A mount as recited in claim 33, further comprising a system for controlling the flow of the incompressible fluid through the valved bypass line by automatic manipulation of the valve.

* * * * *